(12) United States Patent
Rund et al.

(10) Patent No.: US 8,882,152 B2
(45) Date of Patent: Nov. 11, 2014

(54) FENDER ASSEMBLY

(75) Inventors: Anthony M. Rund, Saint Louis, MO (US); Scott R. Miller, Clinton, IL (US); Craig N. Cotterman, Champaign, IL (US)

(73) Assignee: Caterpillar Inc., Peoria, IL (US)

( * ) Notice: Subject to any disclaimer, the term of this patent is extended or adjusted under 35 U.S.C. 154(b) by 197 days.

(21) Appl. No.: 13/360,252

(22) Filed: Jan. 27, 2012

(65) Prior Publication Data

US 2013/0193665 A1    Aug. 1, 2013

(51) Int. Cl.
*B62D 25/18* (2006.01)

(52) U.S. Cl.
USPC ............ 280/847; 280/154; 280/854; 296/198

(58) Field of Classification Search
USPC ......... 280/154, 848, 847, 849, 850, 853, 854, 280/156, 157, 152.2, 152.3; 296/198; D12/181, 184
See application file for complete search history.

(56) References Cited

U.S. PATENT DOCUMENTS

| | | | | |
|---|---|---|---|---|
| 2,009,051 | A * | 7/1935 | King | 224/505 |
| 3,368,826 | A * | 2/1968 | Whitesell | 280/848 |
| 4,436,319 | A * | 3/1984 | Clutter | 280/851 |
| 6,592,147 | B2 | 7/2003 | Lambertus | |
| 6,886,862 | B2 | 5/2005 | Matthew | |
| 6,893,048 | B2 * | 5/2005 | Rush et al. | 280/854 |
| 7,222,884 | B2 * | 5/2007 | Callan et al. | 280/848 |
| 8,066,305 | B2 * | 11/2011 | Eklund et al. | 280/854 |
| 2010/0253034 | A1 | 10/2010 | Crismon et al. | |
| 2011/0057410 | A1 | 3/2011 | Eklund et al. | |

FOREIGN PATENT DOCUMENTS

| | | |
|---|---|---|
| CN | 201172429 | 12/2008 |
| CN | 201367052 | 12/2009 |
| EP | 433794 | 6/1991 |
| GB | 1218911 | 1/1971 |
| GB | 2365396 | 2/2002 |

OTHER PUBLICATIONS

John Deere, Parts Catalog, RXA0062391; Apr. 10, 2003.*
U.S. Patent Application by Anthony M. Rund et al. entitled "Hollow Fender" filed Jan. 27, 2012.
John Deere 8030 Series Tractors brochure, www.JohnDeere.com/Ag, pp. 1-36 (Jan. 27, 2012).
John Deere 244J Series brochure, www.JohnDeere.com/Ag (Jan. 27, 2012), pp. 1-19 (Jan. 27, 2102).
John Deere 30 Series Sprayers brochure, www.JohnDeere.com/Ag, pp. 1-32 (Jan. 27, 2012).

* cited by examiner

*Primary Examiner* — Katy M Ebner
*Assistant Examiner* — Emma K Frick
(74) *Attorney, Agent, or Firm* — Finnegan, Henderson, Farabow, Garrett & Dunner LLP

(57) ABSTRACT

A fender assembly is disclosed for use with a mobile machine. The fender assembly may have a fender with an upper wall, a lower wall, and a frame configured to support the fender. The upper and lower walls may be spaced apart to at least partially form a hollow enclosure. The fender assembly may also have at least one boss extending from the frame at least partially through the hollow enclosure, and at least one fastener configured to engage the at least one boss and press the upper and lower walls toward each other.

15 Claims, 7 Drawing Sheets

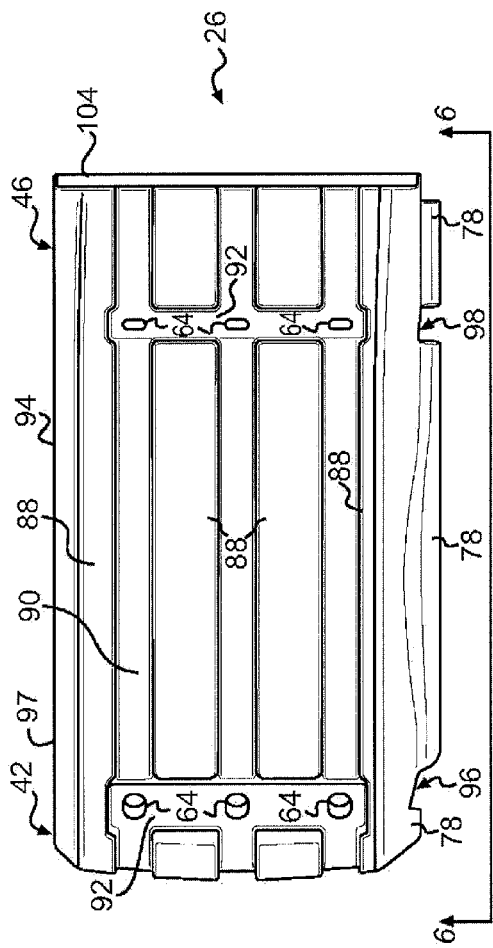
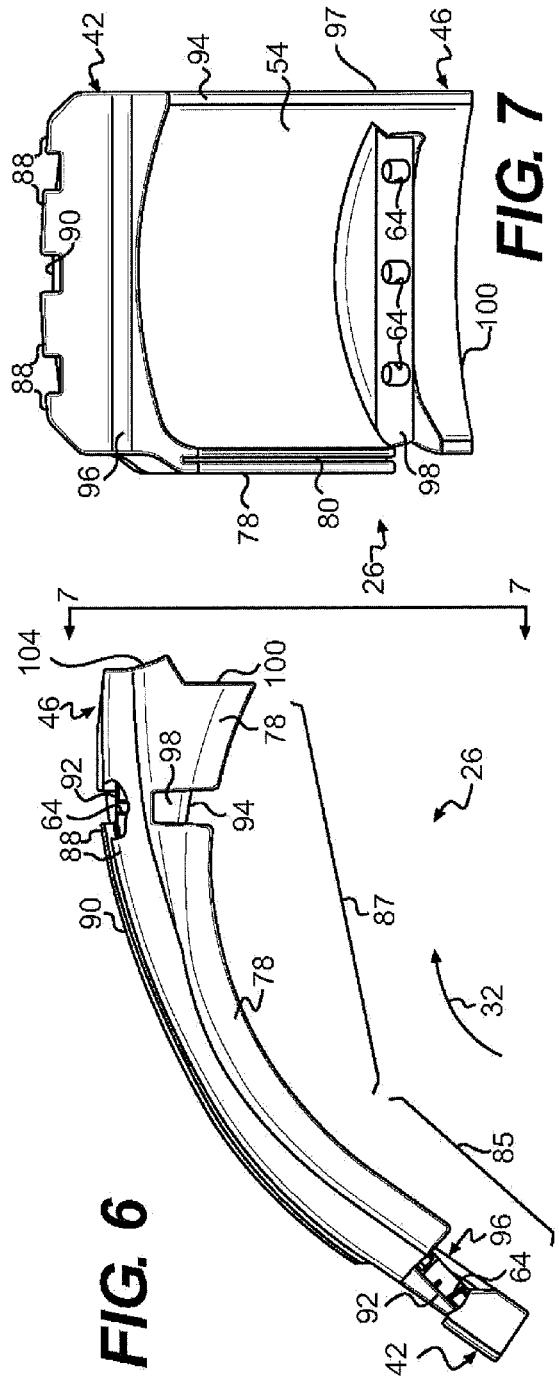
FIG. 5
FIG. 6
FIG. 7

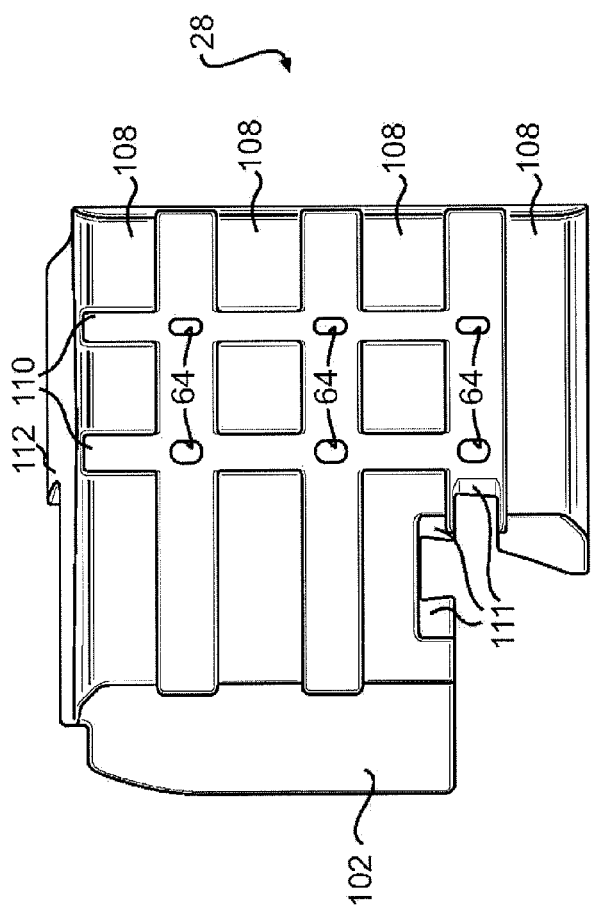
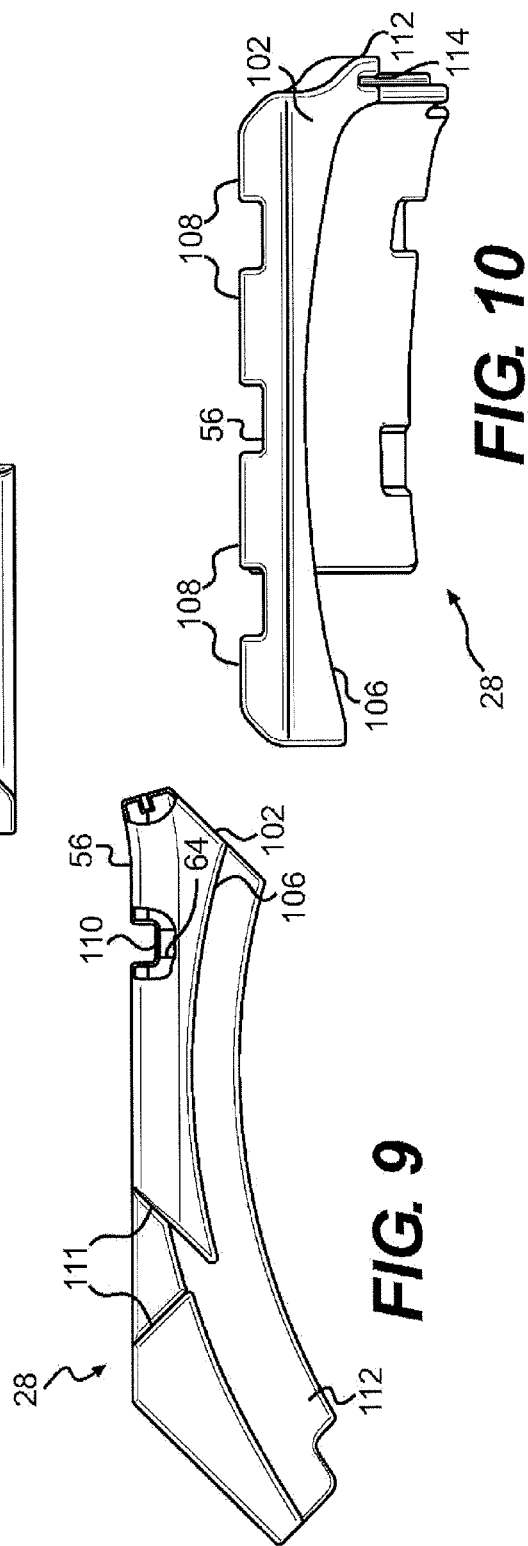
FIG. 8
FIG. 9
FIG. 10

FENDER ASSEMBLY

TECHNICAL FIELD

The present disclosure relates generally to a fender assembly and, more particularly, to a fender assembly for a mobile machine.

BACKGROUND

Machines such as scrapers, wheel loaders, wheel dozers, motor graders, and wheeled excavators are each equipped with fenders that block mud and debris sprayed by the machine's wheels from contacting critical portions of the associated machine. Conventional fenders are fabricated from steel or iron plates and include multiple straight portions that are folded or welded together around a portion of a machine's wheel to form an enclosure that contains the mud and debris during operation. Although effective, these types of fenders can be heavy and tend to collect mud in pockets at the folded or welded areas. The collected mud further increases the weight of the fenders and, in some applications, the combined weight of the fender and accumulated mud can be sufficient to cause the fender to crack or fail completely.

One attempt to improve fender longevity is disclosed in U.S. Pat. No. 6,893,048 of Rush et al. that issued on May 17, 2005 (the '048 patent). In particular, the '048 patent discloses a blow-molded hollow fender made from a high-density polyethylene plastic material. An inner surface of the fender includes slots that receive a corresponding rod. Clamps are bolted to bosses formed on the inner surface of the fender and clamp the rod to the fender. The rod is bent to form three sections, which are attached to the fender so that the fender will not rotate with respect to the rod.

Although the fender of the '048 patent may provide some longevity improvement over conventional fenders through the use of a lighter polyethylene material, it may still be problematic. In particular, the clamps used to connect the rod to the fender may not have sufficient durability for some applications. In addition, the fender may provide no protection from debris thrown axially inward toward the machine by wheels of the machine and too little radial protection. Further, the inner surface of the fender may provide many opportunities for mud collection that can weigh down the fender and increase the likelihood of failure. Finally, the fender of the '048 patent may be not be rigid enough for some applications.

The disclosed fender assembly is directed to overcoming one or more of the problems set forth above and/or other problems of the prior art.

SUMMARY

In one aspect, the present disclosure is directed to a fender assembly. The fender assembly may include a fender having an upper wall, a lower wall, and a frame configured to support the fender. The upper and lower walls may be spaced apart to at least partially form a hollow enclosure. The fender assembly may also include at least one boss extending from the frame at least partially through the hollow enclosure, and at least one fastener configured to engage the at least one boss and press the upper and lower walls toward each other.

In another aspect, the present disclosure is directed to another fender assembly. This fender assembly may include a generally arcuate fender having an upper wall, a lower wall, and an integral lip generally perpendicular to the upper and lower walls that connects the upper and lower walls at internal edges. The upper and lower walls may be spaced apart to at least partially form a hollow enclosure. The fender assembly may also include a sidewall retained within a recess of the integral lip and extending radially inward away from the upper and lower walls, and a seal configured to retain the sidewall within the recess of the integral lip.

In yet another aspect, the present disclosure is directed to another fender assembly. This fender assembly may include a generally arcuate first hollow fender, and a first frame member configured to engage an outer surface of the first hollow fender and retain the first hollow fender at a leading position relative to a forward traveling rotation of an associated traction device. The fender assembly may also include a generally arcuate second hollow fender, and a second frame member configured to engage an outer surface of the second hollow fender and retain the second hollow fender at a trailing position relative to the forward traveling rotation of the associated traction device. The first and second hollow fenders may abut each other at an outer periphery of the associated traction device.

BRIEF DESCRIPTION OF THE DRAWINGS

FIGS. 5-7 are top, end, and side view diagrammatic illustrations of a fender that may be used in conjunction with the fender assembly of FIG. 1;

FIGS. 8-10 are top, side, and end view diagrammatic illustrations of another fender that may be used in conjunction with the fender assembly of FIG. 1.

DETAILED DESCRIPTION

Figure 1:
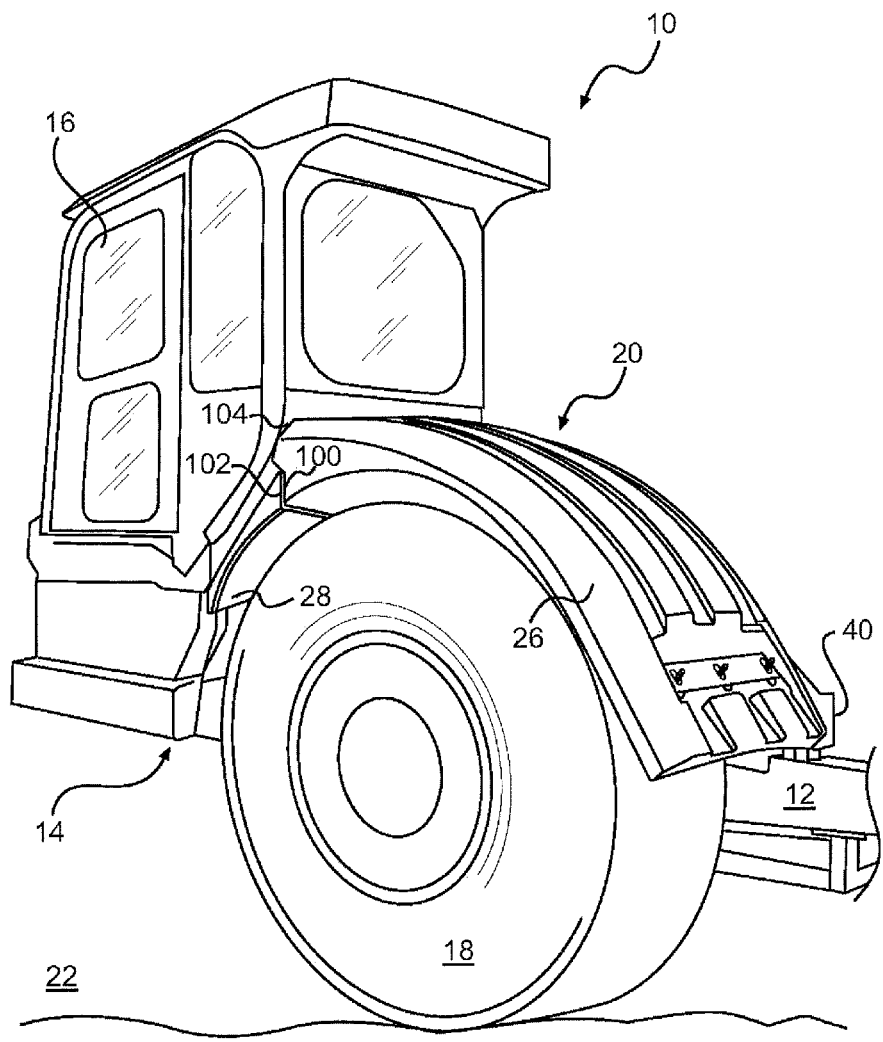
FIG. 1 is a pictorial illustration of a machine having an exemplary disclosed fender assembly.

FIG. 1 illustrates an exemplary embodiment of a machine 10. Machine 10 may be a mobile machine that performs some type of operation associated with an industry such as mining, construction, farming, or another industry known in the art. For example, machine 10 may be an earth moving machine such as a scraper (shown in FIG. 1), a wheel loader, a backhoe, a wheel dozer, or a motor grader. Machine 10, in one example, may include a machine frame 12 that supports a power source 14 and an operator station 16. Machine 10 may also include a plurality of traction devices 18 that are rotatingly connected to machine frame 12 and driven by power source 14 to propel machine 10, and a plurality of fender assemblies 20 (only one shown in FIG. 1) connectable to machine frame 12 (or another support structure of machine 10) and associated with traction devices 18.

Operator station 16 may be an onboard location from which an operator of machine 10 observes performance of machine 10 and provides instructions for controlling machine 10. In the disclosed example, operator station 16 is a substantially enclosed structure supported by frame 12 that includes one or more interface devices (not shown) located proximate an operator seat (not shown). It is contemplated, however, that operator station 16 may alternatively be a generally open platform, if desired, and may or may not include a seat (i.e., the operator may be required to stand during control of machine 10).

Traction devices 18 may embody wheels located on each side of machine 10. For example, two traction devices 18 may be located toward a rear-end of machine 10 (not shown) and arranged in left and right pairs, while two traction devices 18 may be located toward a front-end of machine 10 (only a left front traction device 18 is shown). Any of front and rear traction devices 18 may be driven and/or steered, as desired. It is also contemplated that one or all of traction devices 18 may be replaced with another type of traction device, if desired, such as tracks or belts.

Fender assemblies 20 may function generally as guards associated with traction devices 18, to block mud and debris thrown into the air by traction devices 18 from contacting critical areas of machine 10 (e.g., operator station 16, power source 14, etc.). In the disclosed embodiment, two different configurations of fender assemblies 20 are utilized, including a left fender assembly 20L (shown in FIGS. 1 and 2) and a right fender assembly 20R (shown in FIG. 11). Left fender assembly 20L may be associated with a front traction device 18 located immediately below operator station 16, while right fender assembly 20R may be associated with a front traction device 18 located on an opposing side of machine 10 away from operator station 16. As will be explained in more detail below, each fender assembly 20 may be connectable to machine frame 12 (or another support structure of machine 10) and cantilevered away from machine 10 a distance about equal to an axial dimension of its corresponding traction device 18 (i.e., about equal to a width of traction device 18). Each fender assembly 20 may be configured to at least partially enclose its corresponding traction device 18, for example on at least an upper side (i.e., a side generally parallel with and opposite a ground surface 22 relative to traction device 18) and an inner side (i.e., a side between traction device 18 and frame 12).

Figure 2:
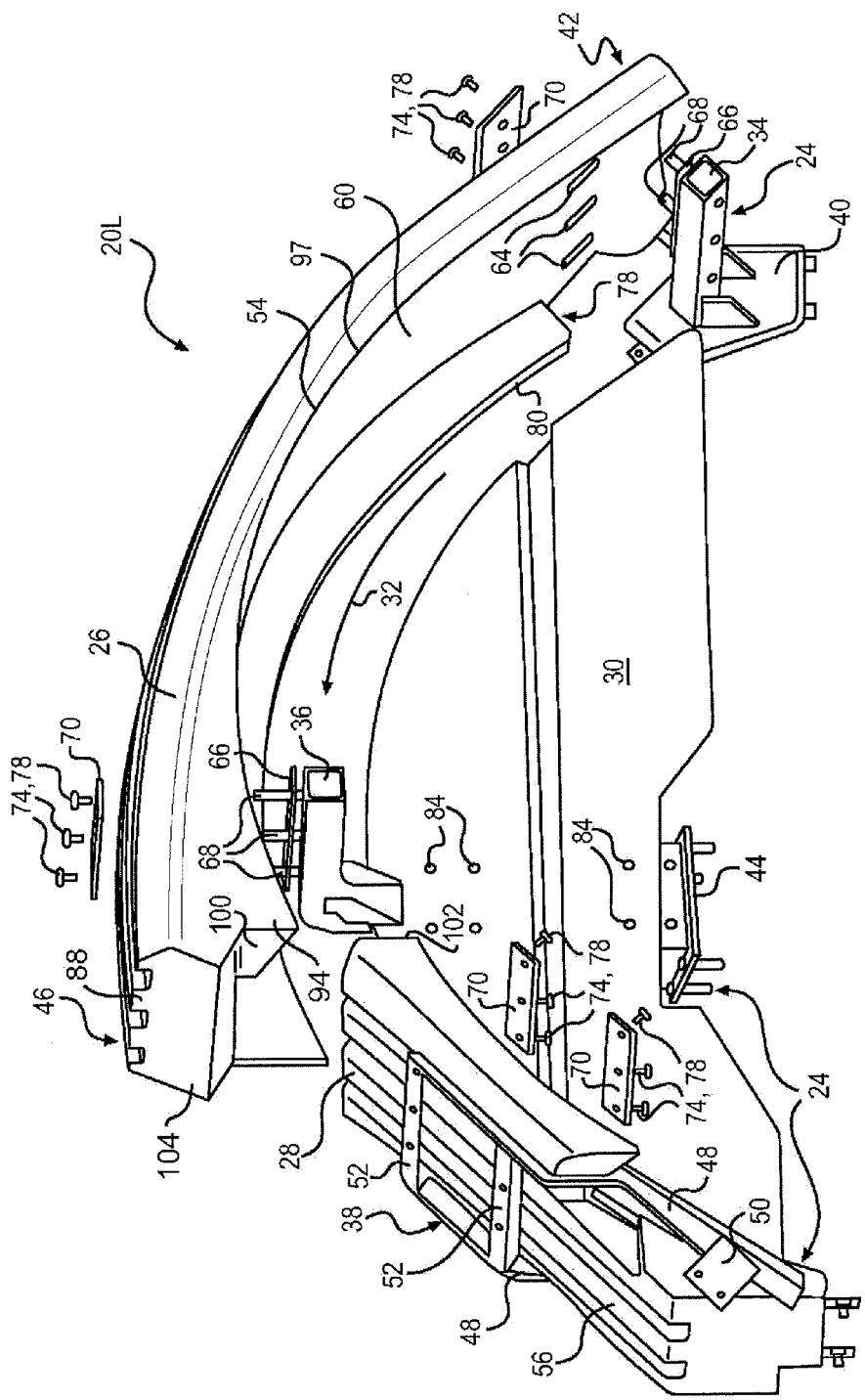
FIG. 2 is an exploded view pictorial illustration of the fender assembly of FIG. 1.

FIG. 2 shows an exemplary embodiment of left fender assembly 20L in exploded view. Left fender assembly 20L may include a frame 24, a first fender 26, a second fender 28, and a side wall 30. First fender 26 may be connected to frame 24 at a leading position relative to a forward rotation of the associated traction device 18 (represented by an arrow 32). Second fender 28 may be connected to frame 24 at a trailing position relative to the forward rotation of the associated traction device 18. A trailing end of first fender 26 may abut a leading end of second fender 28 at a periphery of the associated traction device 18. Sidewall 30 may be connected to each of frame 24, first fender 26, and second fender 28 at an inner axial position relative to traction device 18.

Frame 24 may include a first frame member 34, a second frame member 36, and a third frame member 38. Each of first, second, and third frame members 34, 36, 38 may embody hollow tubes connectable at a proximal end to machine frame 12 and at a distal end to first and second fenders 26, 28 to cantilever first and second fenders 26, 28 from machine frame 12. For example, first frame member 34 may be generally straight and connectable at its proximal end to machine frame 12 via a bracket 40 that is fixed to machine frame 12. First frame member 34 may also be connectable at its distal end to a leading end 42 of first fender 26. Second frame member 36 may be bent, for example through an angle of about 90°, and connectable to machine frame 12 at its proximal end via a bracket 44. Second frame member 36 may also be connectable at its distal end to a trailing end 46 of first fender 26. Third frame member 38 may include two generally parallel tubes or arms 48 that are each bent into an S-shape and connectable at their proximal ends to machine frame 12 (e.g., directly or via operator station 16) by way of one or more brackets 50, and one or more cross members 52 that extend between parallel tubes 48. Third frame member 38 may be connectable at its distal end to a mid-portion of second fender 28 via cross members 52. First and second frame members 34, 36 may engage a radially inward facing surface 54 of first fender 26, while third frame member 38 may engage a radially outward facing surface 56 of second fender 28.

Figure 3:
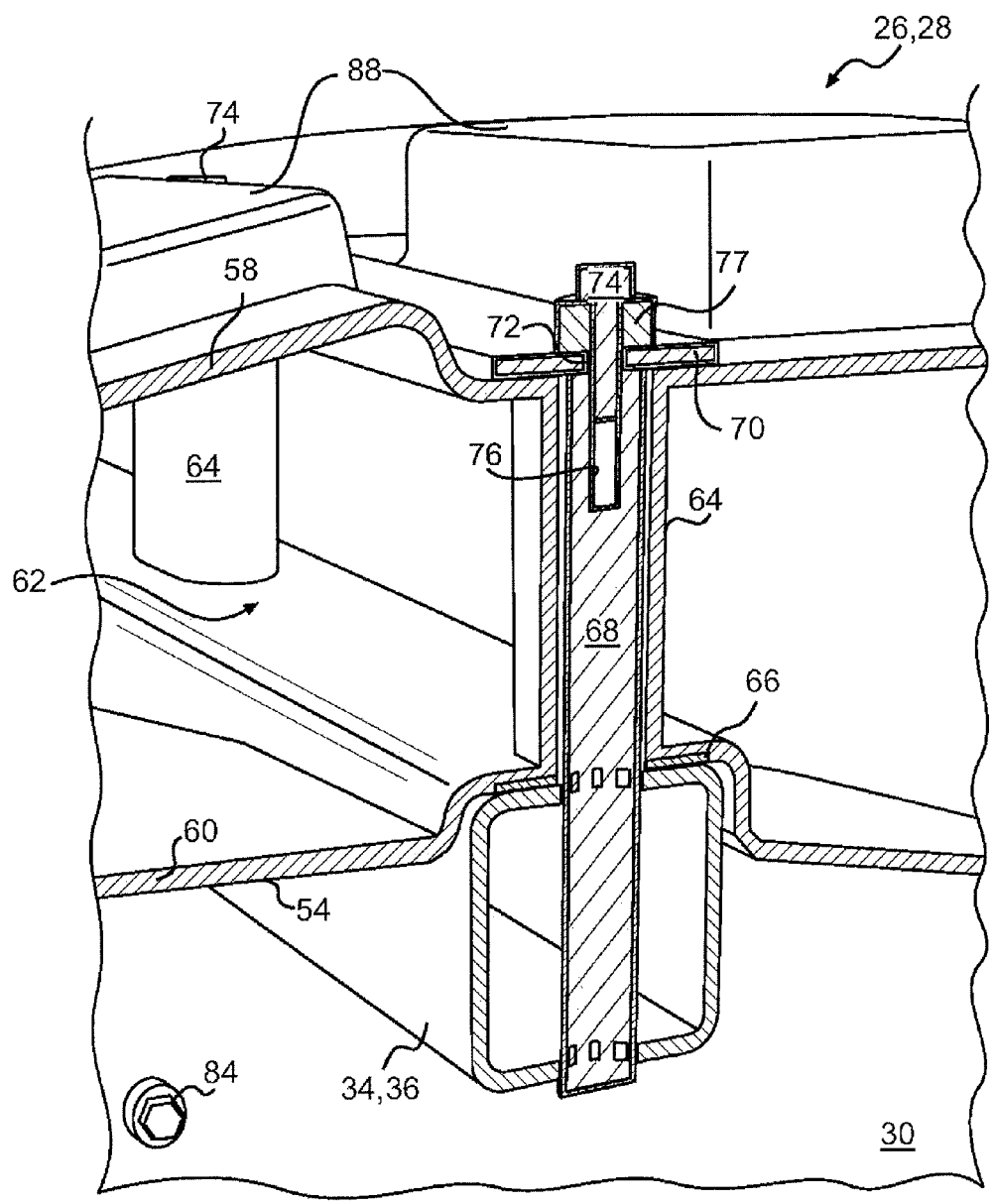
FIG. 3 is an enlarged pictorial illustration of a portion of the fender assembly of FIG. 1.

FIG. 3 illustrates an exemplary mounting configuration that can be used to attach the distal ends of any one of first, second, and third frame members 34, 36, 38 to the respective one of first and second fenders 26, 28. As will be described in more detail below, each of first and second fenders 26, 28 may each include opposing walls (e.g., an upper wall 58 and a lower wall 60) that are spaced apart from each other to at least partially form a hollow enclosure 62, and a plurality of tubular structures 64 that are integral with and extend through the walls. A surface of one of the opposing walls (e.g., inward facing surface 54 of lower wall 60) may be supported by the respective frame member 34, 36, 38, and a compressible strip 66 (e.g., a rubbers strip) may be disposed between the surface and the frame member to inhibit relative movement therebetween. A plurality of bosses 68 (only one shown in FIG. 3) may extend from the frame member through the immediate adjacent wall (e.g., through lower wall 60) and at least partway into hollow enclosure 62 via tubular structures 64. In one embodiment, each boss 68 may extend through a hollow portion of the respective fame member and be welded or otherwise fixedly connected to opposing tubular sides of the frame member. A plate 70 may engage an outer surface of the other wall (e.g., of upper wall 58) and include a plurality of openings 72 configured to align with tubular structures 64 and bosses 68. One or more fasteners 74 may extend through openings 72 and engage threaded bores 76 within distal ends of bosses 68, and a plurality of washers 77 or other load-distributing members may be disposed between heads of fasteners 74 and plate 70. In the disclosed embodiment, a protruding length of boss 68 may be less than an uncompressed distance between the opposing walls, such that when fasteners 74 are engaged with threaded bores 76 of bosses 68, plate 70 may compress the associated fender and press the opposing walls towards each other. As will be described in more detail below, first and/or second fenders 26, 28 may include recesses, steps, and/or flattened areas at mating interfaces with the respective frame members to accommodate mounting, inhibit fender movement, and/or reduce a protrusion distance of the frame members toward the associated traction device 18.

Figure 4:
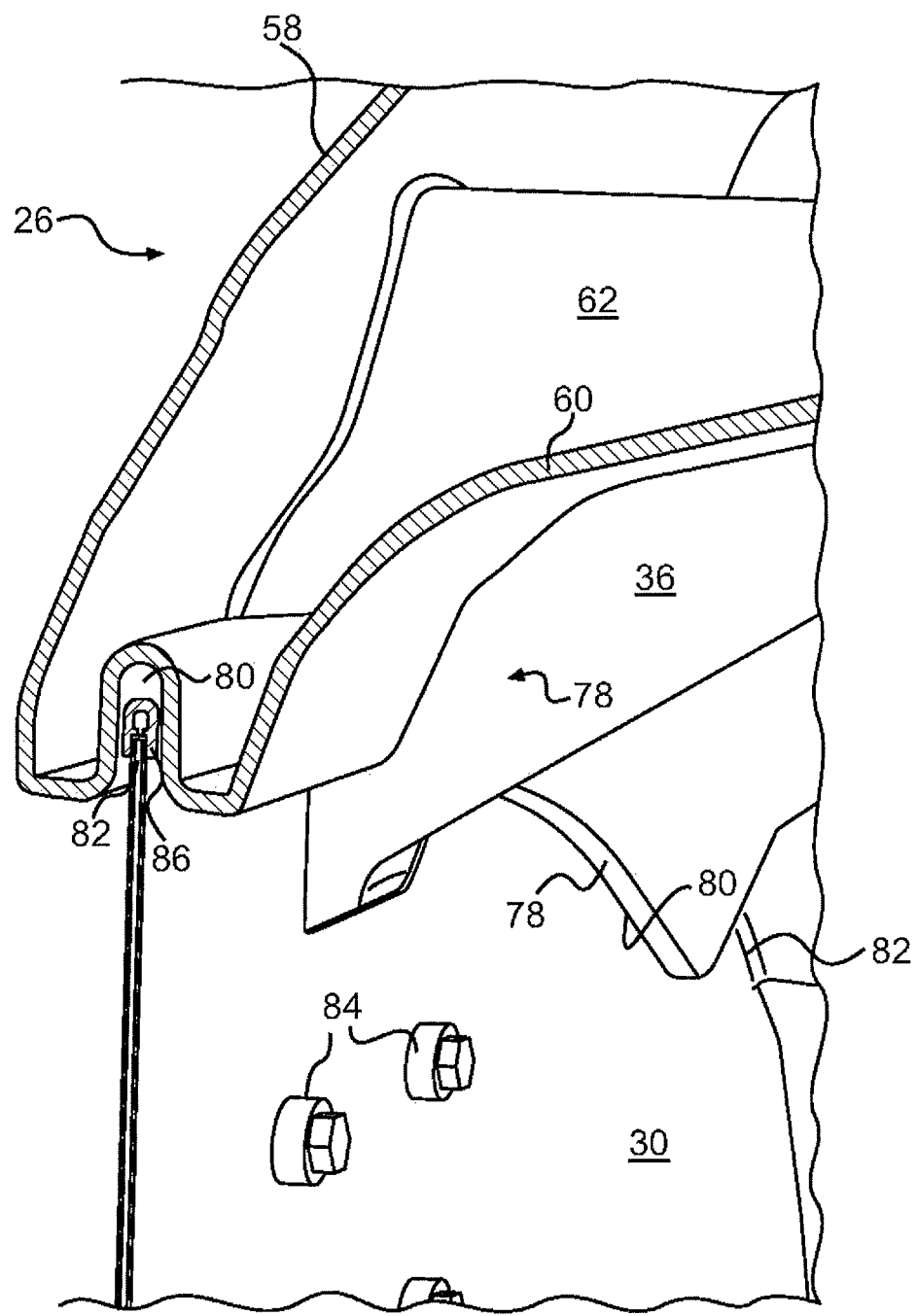
FIG. 4 is an enlarged pictorial illustration of another portion of the fender assembly of FIG. 1.

As shown in FIG. 4, first fender 26 may include features configured to receive and constrain sidewall 30. Specifically, first fender 26 may include a generally vertical lip 78 located at an inside axial edge that is integral with and joins upper and lower walls 58, 60. Lip 78 may be generally perpendicular to upper and lower walls 58, 60 and extend in a lengthwise direction of first fender 26. Lip 78 may include a recess or groove 80 at a lower portion (i.e., a portion facing traction device 18) that is configured to receive an upper edge 82 of sidewall 30. Sidewall 30 may be retained in position relative to first fender 26 by way of one or more fasteners 84 that connect sidewall 30 to an upright portion of first frame member 34 and/or directly to machine frame 12 (referring to FIG. 1). Upper edge 82 of sidewall 30 may be retained within groove 80 via a bulb seal 86 or another type of seal. First fender 26 (and second fender 28) may be fabricated from a plastic material, for example polyethylene, while first frame member 34, second frame member 36, third frame member 38, and sidewall 30 may be metallic. Bulb seal 86 may be fabricated from a compressible material, for example rubber.

FIGS. 5-7 illustrate detailed geometry of first fender 26. As shown in FIG. 6, first fender 26 may include a generally straight portion 85 located at leading end 42, and an arcuate portion 87 located at trailing end 46. Arcuate portion 87 may comprise a greater portion of first fender 26 than straight portion 85, and be generally concentric with the associated traction device 18 (shown in FIG. 1). Straight portion 85 may be integral with arcuate portion 87 and angled outward at a distal end away from traction device 18. The outward angle of straight portion 85 may help to reduce a choke point for mud and debris attached to traction device 18, while also decreasing wear of first fender 26 at the distal end. As shown in FIG. 7, both straight portion 85 and arcuate portion 87 may be generally smooth and curved in a traverse direction at inward facing surface 54. This smooth curvature may help to reduce a likelihood of mud and debris collecting at inward facing surface 54.

It is contemplated that, in some embodiments, fender assemblies 20 may be utilized as standing platforms during service of machine 10. In these embodiments, as can be seen in FIG. 5, both straight and arcuate portions 85, 87 may include one or more corrugations 88 within an outer surface 90 that extend in a length direction of first fender 26. In the disclosed exemplary embodiment, four corrugations 88 are shown, although any number of corrugations 88 may be included and utilized based on a rigidity requirement of fender assembly 20. Corrugations 88 may be disposed within only outer surface 90 to enhance rigidity of first fender 26 without creating internal mud-collecting cavities that could weigh down first fender 26. Transverse recesses 92 may be provided within outer surface 90 that cut across corrugations 88 to provide generally flat mounting locations for plates 70 (referring to FIG. 2). Tubular structures 64 that pass through first fender 26 to receive bosses 68 and fasteners 74 may be located within recesses 92.

Lip 78, in addition to receiving sidewall 30 (referring to FIGS. 2 and 4), may also help to enhance the rigidity of first fender 26. Lip 78 is illustrated in FIGS. 5-7 as extending along a majority length of first fender 26, for example along nearly an entire length of arcuate portion 87 and along at least some length of straight portion 85. FIGS. 2 and 5-7 illustrate first fender 26 as also including a secondary lip 94 intended to enhance fender rigidity at a likely operator support location (e.g., at an apex of left fender assembly 20L). Secondary lip 94 may begin to protrude radially inward from an outer intersecting edge 97 of upper and lower walls 58, 60 (i.e., an edge located transversely opposite lip 78) at a general midpoint of arcuate portion 87, and achieve a maximum protruding distance at trailing end 46 of first fender 26. Secondary lip 94 may extend only partway along the length of arcuate portion 87 to reduce formation of mud-collecting cavities within first fender 26, while still adding to the vertical rigidity of left fender assembly 20L.

First fender 26 may be provided with geometry designed to accomodate frame 24. In particular, inward facing surface 54 of first fender 26 may include a step 96 at leading end 42 and a recess 98 at trailing end 46 (e.g., at a transition area between straight portion 85 and arcuate portion 87) to receive first and second frame members 34, 36, respectively. Step 96 may allow first frame member 34 to extend inward from inward facing surface 54 toward traction device 18 and be exposed to mud and debris clinging to the periphery of traction device 18, such that first frame member 34 may function to knock the mud and debris off of traction device 18. Because first frame member 34 may be disposed within a step (as opposed to a recess), a leading surface of first frame member 34 may directly engage the mud and debris while first frame member 34 protects first fender 26 behind a trailing surface (i.e., an end surface of step 96 may be shielded from the mud and debris by first frame member 34). Recess 98 may allow a majority (if not all) of second frame member 36 to be recessed within first fender 26 (i.e., a depth of recess 98 may be greater than a height of step 96), such that a number and/or severity of mud-collecting cavities at inward facing surface 54 may be reduced. Lip 78 may be notched at step 96 and/or recess 98 to accommodate first and second frame members 34, 36. In some embodiments, the notches in lip 78 may also engage first and second frame members 34, 36 to help reduce an amount of relative movement between first fender 26 and frame 24.

Trailing end 46 of first fender 26 may be shaped to allow engagement with second fender 28, while also inhibiting ingress of mud and debris into the interface between first and second fenders 26, 28. Specifically, as shown in FIGS. 1 and 2, first fender 26 may include a first mating surface 100 configured to engage a generally parallel second mating surface 102 of second fender 28. The interface of first and second mating surfaces 100, 102 may be generally vertical relative to ground surface 22 and perpendicular to a tangential mud and debris break-away trajectory from traction device 18. This interface orientation may help to reduce an amount of mud and debris deposited between first and second mating surfaces 100, 102. First fender 26 may also include an upper angled surface 104 that provides clearance for operator station 16.

The location of first and second frames 34, 36 at inward facing surface 54 of first fender 26 may improve ease of assembly and reduce a likelihood of mud accumulation. In particular, because of the size and weight of first fender 26, it may be difficult for a service technician to support first fender 26 during assembly. However, in the current configuration, the service technician, after having already mounted first and second frame members 34, 36 to machine frame 12, may rest first fender 26 on first and second frame members 34, 36 during installation of plates 70 and fasteners 74. Further, as described above, first and/or second frame members 34, 36 may extend a distance from inward facing surface 54 radially inward toward traction device 18 and thereby function to knock mud and debris off of traction device 18.

FIGS. 8-10 illustrate detailed geometry of second fender 28. As shown in FIG. 9, second fender 28 may be arcuate and generally concentric with the associated traction device 18 (referring to FIG. 1). Second fender 28, like first fender 26, may also be generally smooth and curved in a traverse direction at an inward facing surface 106. This smooth curvature may help to reduce a likelihood of mud and debris collecting at inward facing surface 106. As shown in FIGS. 8 and 10, second fender 28 may also include one or more lengthwise corrugations 108 in general alignment with corrugations 88 of first fender 26 to enhance structural rigidity of second fender 28, and transverse recesses 110 within outward facing surface 56 that cut across corrugations 108 to provide generally flat mounting locations for cross members 52 (referring to FIG. 2). Tubular structures 64 that pass through second fender 28 to receive bosses 68 and fasteners 74 may be located within recesses 110. In addition, notches 111 may be formed within side portions of second fender 28 to receive tubes 48 of third frame member 38. Second fender 28 may also be provided with a generally flat mounting location (not shown) at inward facing surface 106 near the lengthwise midpoint to receive plates 70 that connect to bosses 68 of cross members 52.

Second fender 28 may include a lip 112, similar to lip 78, that is located at an inside lengthwise edge of second fender 28. Lip 112 may have a groove 114 recessed within a lower surface thereof to receive edge 82 of sidewall 30 and bulb seal 86. Lip 112 may extend from the interface with first fender 26 along an entire length of second fender 28.

Third frame member 38 may engage outward facing surface 56 of second fender 28 to improve ease of assembly and reduce a likelihood of mud accumulation. In particular, it may be difficult to access outward facing surface 56 during installation of second fender 28 because of the location of second fender 28 against an underside of operator station 16. In the current frame configuration, however, a service technician, after having already mounted third frame member 38 to machine frame 12, may place second fender 28 over bosses 68, and connect plates 70 and fasteners 74 to bosses 68 from the underside of second fender 28. In addition, because only flat plates 70 and fasteners 74 may be exposed to the mud and debris thrown by traction device 18, few (if any) cavities may be created that can collect mud during operation of machine 10.

Figure 11:
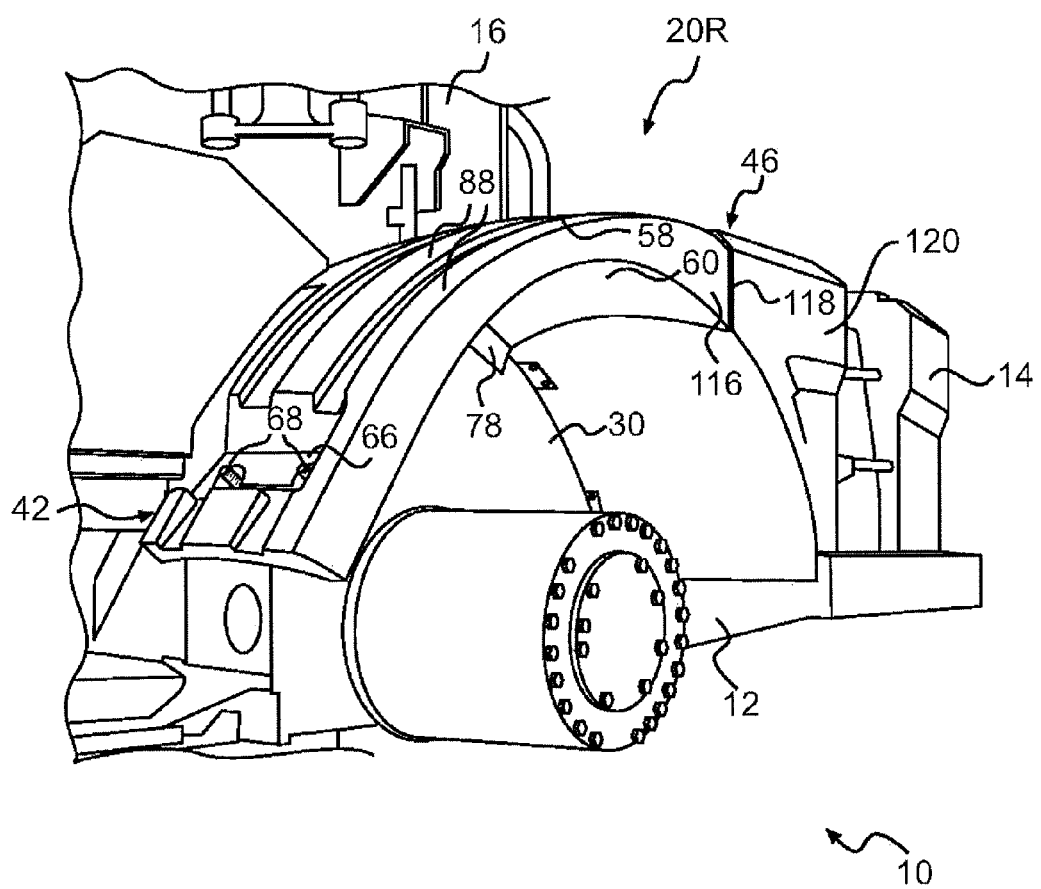
FIG. 11 is a pictorial illustration of the machine of FIG. 1 having another exemplary disclosed fender assembly.

FIG. 11 illustrates right fender assembly 20R. Right fender assembly 20R, for the most part, may be a mirror image of left fender assembly 20L. However, because of the configuration of the disclosed machine 10 (i.e., because operator station 16 may be offset toward the left side of machine 10), right fender assembly 20R may not be required to accommodate operator station 16 in the same manner as left fender assembly 20L. Specifically, right fender assembly 20R may include a single fender 116 having a simplified trailing end-face 118 (e.g., a flat end-face) configured mate against a cowling 120 of machine 10.

INDUSTRIAL APPLICABILITY

The disclosed fender assemblies may be applicable to any mobile machine where light-weight, durable protection from wheel-thrown mud and debris is desired. The disclosed fender assemblies may be lightweight through the use of hollow plastic fenders and unique geometry that inhibits mud buildup within the fenders. The disclosed fender assemblies may be durable through the use of multi-layered fenders that are corrugated to enhance rigidity and supported by multiple frame members through unique mounting configurations. The disclosed fenders may provide for protection from wheel-thrown mud and debris via geometry that blocks both radially and axially discharged material.

It will be apparent to those skilled in the art that various modifications and variations can be made to the disclosed fender assemblies without departing from the scope of the disclosure. Other embodiments of the fender assemblies will be apparent to those skilled in the art from consideration of the specification and practice of the fender assemblies disclosed herein. It is intended that the specification and examples be considered as exemplary only, with a true scope being indicated by the following claims and their equivalents.

What is claimed is:

1. A fender assembly, comprising:
a fender having an upper wall and a lower wall, the upper and lower walls being spaced apart to at least partially form a hollow enclosure;
a frame configured to support the fender;
at least one boss extending from the frame at least partially through the hollow enclosure of the fender; and
at least one fastener configured to engage the at least one boss and press the upper and lower walls toward each other,
the frame engages an outer surface of the lower wall;
the at least one boss extends from the frame through the lower wall toward the upper wall;
the at least one fastener engages an outer surface of the upper wall;
wherein:
the at least one boss includes a plurality of bosses;
the at least one fastener includes a plurality of fasteners;
the fender assembly further includes a plate configured to engage the outer surface of the upper wall;
the plurality of fasteners connects the plate with the plurality of bosses;
the fender includes a plurality of tubular structures integral with the upper and lower walls and passing through the hollow enclosure; and
the plurality of bosses extend through the plurality of tubular structures.

2. The fender assembly of claim 1, wherein the fender further includes:
a flat recess in the outer surface of the upper wall configured to receive the plate; and
a recess in the outer surface of the lower wall configured to receive the frame.

3. The fender assembly of claim 2, wherein the frame protrudes from the recess a distance toward an associated traction device.

4. The fender assembly of claim 1, further including a compressible strip disposed between the frame and the outer surface of the lower wall of the fender.

5. The fender assembly of claim 1, wherein:
the frame includes a hollow tube; and
the plurality of bosses extend from a first side of the hollow tube through an opposing second side of the hollow tube, the plurality of bosses being fixedly connected to the first and second sides of the hollow tube.

6. The fender assembly of claim 1, wherein:
the fender is a first fender;
the fender assembly further includes a second fender abutting a trailing end of the first fender relative to a forward travel direction of an associated traction device; and
the frame includes:
a first frame member connected to the lower wall of the first fender; and
a second frame member connected to an upper wall of the second fender.

7. The fender assembly of claim 6, wherein a distance between the upper and lower walk of the first fender is greater at the trailing end than at an opposing leading end.

8. The fender assembly, comprising:
a tender having an upper wall and a lower wall, the upper and lower walls being spaced apart to at least partially form a hollow enclosure;
a frame configured to support the fender;
at least one boss extending from the frame at least partially through the hollow enclosure of the fender; and
at least one fastener configured to engage the at least one boss and press the upper and lower walls toward each other, wherein:
the fender includes a generally arcuate portion and a generally straight portion connected at a leading end to the generally arcuate portion relative to a forward traveling direction of an associated traction device;
the frame includes a first frame member connectable to the generally arcuate portion and a second frame member connectable at a transition between the generally arcuate and generally straight portions; and the second frame member protrudes a greater distance from the fender toward an associated traction device than a protrusion distance of the first frame member.

9. A fender assembly, comprising:
a fender having an upper wall and a lower wall, the upper and lower walls being spaced apart to at least partially form a hollow enclosure;
a frame configured to support the fender;
at least one boss extending from the frame at least partial through the hollow enclosure of the fender; and
at least one fastener configured to engage the at least one boss and press the upper and lower walls toward each other, wherein:
the fender includes an integral lip connecting the upper and lower walls at an internal edge; and
the fender assembly further includes:
an axial side wall received within a recess of the integral lip; and
a bulb seal configured to retain the axial side wall within the integral lip.

10. The fender assembly of claim 9, wherein the integral lip of the fender includes at least one notch configured to receive the frame.

11. The fender assembly of claim 9, wherein:
the fender is plastic; and
the axial sidewall and frame are metallic.

12. A fender assembly, comprising:
a generally arcuate fender having an upper wall, a lower wall, and an integral lip generally perpendicular to the upper and lower walls that connects the upper and lower walls at internal edges, the upper and lower walls being spaced apart to at least partially form a hollow enclosure;
a sidewall retained within a recess of the integral lip and extending radially inward away from the upper and lower wall;
a seal configured to retain the sidewall within the recess of the integral lip;
a frame configured to connect the generally arcuate fender to a machine; and
a compressible strip disposed between the frame and an outer surface of the lower wall of the generally arcuate fender, wherein:
the generally arcuate fender is a first fender;
the fender assembly further includes a second fender abutting a trailing end of the first fender relative to a forward travel direction of an associated traction device; and
the frame includes:
a first frame member connected to the lower wall of the first fender; and
a second frame member connected to an upper wall of the second fender.

13. The fender assembly of claim 12, wherein:
the generally arcuate fender is plastic; and
the sidewall and frame are metallic.

14. A fender assembly, comprising:
a generally arcuate first hollow fender;
a first frame member configured to engage an outer surface of the first hollow fender and retain the first hollow fender at a leading position relative to forward traveling rotation of an associated traction device;
a generally arcuate second hollow fender; and
a second frame member configured to engage an outer surface of the second hollow fender and retain the second hollow fender at a trailing position relative to forward traveling rotation of the associated traction device, wherein;
the first and second hollow fenders abut each other at an outer periphery of the associated traction device;
the first hollow fender includes an upper wall and a lower wall spaced apart from each other to at least partially form a first hollow enclosure;
the first frame member is at least partially recessed within an outer surface of the lower wall of the first hollow fender;
the second hollow fender includes an upper wall and a lower wall spaced apart from each other to at least partially form a second hollow enclosure;
the second frame member is at least partially recessed within an outer surface of the upper wall of the second hollow fender;
the first frame member includes:
a first arm located at a leading end of the first hollow fender; and
a second arm located at a trailing end of the first hollow fender; and
the first arm protrudes from the outer surface of the lower wall of the first hollow fender a greater distance than the second arm protrudes from the outer surface of the lower wall of the first hollow fender.

15. The fender assembly of claim 14, further including:
a first compressible strip disposed between the first frame member and the outer surface of the lower wall of the first hollow fender; and
a second compressible strip disposed between the second frame member and the outer surface of the lower wall of the second hollow fender.

* * * * *

UNITED STATES PATENT AND TRADEMARK OFFICE
CERTIFICATE OF CORRECTION

PATENT NO. : 8,882,152 B2  Page 1 of 1
APPLICATION NO. : 13/360252
DATED : November 11, 2014
INVENTOR(S) : Rund et al.

It is certified that error appears in the above-identified patent and that said Letters Patent is hereby corrected as shown below:

In the Claims

Column 8, line 50, in Claim 8, delete "The" and insert -- A --.

Signed and Sealed this
Seventeenth Day of November, 2015

Michelle K. Lee
*Director of the United States Patent and Trademark Office*